(No Model.)
P. M. RUSSELL.
ROTARY SLIDE FOR STOVE OVENS.
No. 420,891. Patented Feb. 4, 1890.
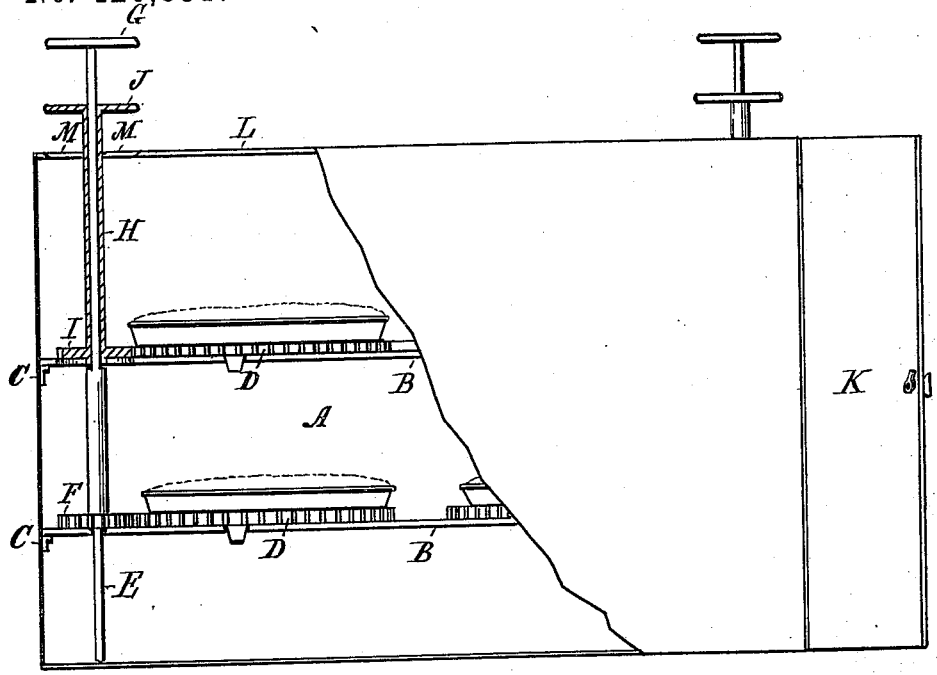
Fig. I.
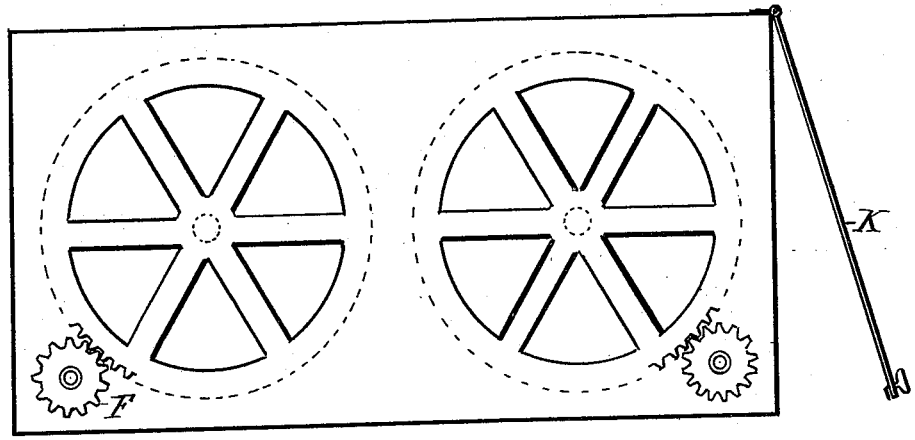
Fig. II.
WITNESSES:
Robert Kirk
Robt S. Millar
INVENTOR:
Perry M. Russell
By
Attorney.

UNITED STATES PATENT OFFICE.

PERRY M. RUSSELL, OF KINGSTON, OHIO.

ROTARY SLIDE FOR STOVE-OVENS.

SPECIFICATION forming part of Letters Patent No. 420,891, dated February 4, 1890.

Application filed July 9, 1887. Serial No. 243,827. (No model.)

*To all whom it may concern:*

Be it known that I, PERRY M. RUSSELL, of Kingston, in the county of Ross and State of Ohio, have invented a new and useful Improvement in Rotary Slides for Stove-Ovens, which improvement is fully set forth in the following specification and accompanying drawings, in which—

Figure I is a side view, partly in section, of a stove-oven equipped with my rotary slides, and Fig. II a top or plan view of the same.

The object of my invention is to provide an adjustable slide for gasoline or oil stoves, so arranged, either in the oven or in contact with the flame, that the slide can be revolved without opening the oven-door, and it is also adapted for use in connection with the ordinary cooking-stove; and it consists of one or more disks adapted to rotate, each disk having a toothed rim in engagement with a stem provided with a toothed pinion, which extends to the outside of the stove or oven, all of which will now be minutely set forth.

In the accompanying drawings, A represents the oven, having one or more shelves B therein. These shelves may or may not be stationary; but in either event they are attached to cleats C at the side of the oven. Each shelf is provided with one or more rotating disks D. These disks have toothed edges, as shown, and are located, preferably, one above the other on the two shelves.

E is a vertical stem, the lower end of which rests on the bottom of the oven and the upper end extends from the top of the stove or oven. The lower end of this stem, below the bottom shelf B, is reduced in size and a small pinion F is placed on this stem in such a position that it meshes with the toothed rim of the rotating disk on the lower shelf. The upper end of this stem E from the point below the upper shelf is reduced and extends up through a tubular stem, the upper end being provided with a hand-wheel G above and outside the oven. The tubular piece H is placed over the upper reduced end of the stem E, the lower end of which carries a pinion I, which meshes with the toothed rim of the disk on the upper shelf. The upper end of the tubular stem H has above and outside the oven a hand-wheel J, by means of which it may be operated independently of the stem E. As shown in the drawings, the oven may be provided with two series of these operating stems and disks. The door K is preferably made of glass or mica, so that the baking operation can be witnessed without opening the door. When it is desired to turn the articles which are placed in the disks D, the hand-wheels G J are used, thereby saving both time and fuel and preventing the doors from being opened unnecessarily.

I would further call attention to the fact that the disks D G are placed in the oven so that they can be moved readily, and the top L of the oven is provided with an opening covered by lids M, which are removable. The rods or stems E and H project through said opening, so that when the lids are removed the stems E H can be taken out together with the pinions at their lower ends, and the lid is now replaced, thereby making a plain oven without the rotary attachment.

What I claim as new is—

1. In a stove-oven having an opening covered by lids M, the combination of the shelves placed one above the other and each having a toothed and rotating disk thereon, with the vertical stem or rod E, having at its upper end the wheel G and near its lower end a pinion F, meshing with the disk on the lower shelf, and the tubular piece H, placed over said stem E, and both the tubular piece and stem passing through said lid M, and said piece H having at its upper end the hand-wheel J, and at the lower end a pinion I, meshing with the disk on the upper shelf, all as and for the purposes set forth.

2. In an oven having an opening covered by lids M and a shelf having toothed rotating disk thereon, the vertical rod or stem E, passing through said lid and having near its lower end a pinion F, meshing with said disk, and at its upper end above the stove having a hand-wheel G, as and for the purposes set forth, whereby the stem and pinion can, when desired, be bodily removed through the opening covered by the said lids.

In testimony that I claim the foregoing I have hereunto set my hand, this 25th day of May, 1887, in presence of witnesses.

PERRY M. RUSSELL.

Witnesses:
CHAS. B. JACK,
JOHN T. JACK.